(12) United States Patent
Allidieres

(10) Patent No.: US 8,931,502 B2
(45) Date of Patent: Jan. 13, 2015

(54) GAS-DISPENSING DEVICE AND FACILITY COMPRISING SUCH A DEVICE

(75) Inventor: Laurent Allidieres, Saint Martin d'Uriage (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 184 days.

(21) Appl. No.: 13/638,750

(22) PCT Filed: Mar. 1, 2011

(86) PCT No.: PCT/FR2011/050413
§ 371 (c)(1),
(2), (4) Date: Oct. 1, 2012

(87) PCT Pub. No.: WO2011/121200
PCT Pub. Date: Oct. 6, 2011

(65) Prior Publication Data
US 2013/0019957 A1   Jan. 24, 2013

(30) Foreign Application Priority Data
Apr. 2, 2010   (FR) ...................................... 10 52496

(51) Int. Cl.
*F16K 17/38* (2006.01)
*F16K 11/074* (2006.01)
(52) U.S. Cl.
CPC .............. *F16K 11/074* (2013.01); *F16K 17/386* (2013.01); *Y02E 60/321* (2013.01)
USPC ............................ 137/79; 137/72; 137/625.11
(58) Field of Classification Search
CPC .............................. F16K 11/074; F16K 17/386

USPC .......................................... 137/72, 79, 625.11
See application file for complete search history.

(56) References Cited

U.S. PATENT DOCUMENTS

| | | | | |
|---|---|---|---|---|
| 708,785 | A * | 9/1902 | Staaf ........................ | 137/625.11 |
| 1,791,923 | A | 2/1931 | Eule | |
| 2,209,135 | A * | 7/1940 | Parker ...................... | 137/625.11 |
| 2,226,169 | A * | 12/1940 | Koehler .................... | 137/625.11 |
| 2,233,840 | A * | 3/1941 | Koehler .................... | 137/625.11 |

(Continued)

FOREIGN PATENT DOCUMENTS

GB   732 572   6/1955

OTHER PUBLICATIONS

International Search Report for PCT/FR2011/050413, mailed May 6, 2011.

(Continued)

*Primary Examiner* — John Rivell
(74) *Attorney, Agent, or Firm* — Christopher J. Cronin

(57) ABSTRACT

The invention relates to a gas-dispensing device for connecting a plurality of pressurized gas sources (E1, E2, E3, E4) to a user, the device including a housing provided with a plurality of gas inlets to be connected to respective gas sources (E1, E2, E3, E4) and an outlet to be connected to a user member, a dispensing member that selectively movable, relative to the body, into separate dispensing positions for selectively putting each inlet in communication with the outlet in turn, while the other inlets are isolated from the outlet, characterized in that the device comprises an emergency discharge system that is movable into an operative position in which all the gas inlets are simultaneously forcedly connected to a gas discharge outlet.

11 Claims, 2 Drawing Sheets

(56) References Cited

U.S. PATENT DOCUMENTS

| | | | | |
|---|---|---|---|---|
| 2,377,473 A | * | 6/1945 | Wolcott | 137/625.11 |
| 2,398,437 A | | 4/1946 | McGill et al. | |
| 2,405,940 A | * | 8/1946 | Burkhardt | 137/625.11 |
| 2,612,341 A | * | 9/1952 | Bridgefield | 137/625.11 |
| 2,888,952 A | * | 6/1959 | Klaren et al. | 137/625.11 |
| 3,520,327 A | * | 7/1970 | Abbott et al. | 137/625.11 |
| 3,559,685 A | | 2/1971 | deFries | |
| 3,837,360 A | * | 9/1974 | Bubula | 137/625.11 |
| 3,841,551 A | * | 10/1974 | Ota | 137/625.11 |
| 4,305,417 A | * | 12/1981 | Bell, Jr. | 137/625.11 |
| 6,098,646 A | * | 8/2000 | Hennemann et al. | 137/625.11 |
| 8,322,374 B2 | * | 12/2012 | Tomita | 137/625.11 |

OTHER PUBLICATIONS

French Search Report for FR 1 052 496, mailed Nov. 30, 2010.

* cited by examiner

GAS-DISPENSING DEVICE AND FACILITY COMPRISING SUCH A DEVICE

CROSS-REFERENCE TO RELATED APPLICATIONS

This application is a §371 of International PCT Application PCT/FR2011/050413, filed Mar. 1, 2011, which claims §119(a) foreign priority to French patent application 1052496, filed Apr. 2, 2010.

BACKGROUND

1. Field of the Invention

The present invention relates to a gas-dispensing device and installation.

The invention relates more specifically to a gas-dispensing device for connecting a plurality of pressurized gas sources sequentially to a user, the device consisting of a housing provided with a plurality of gas inlets intended to be connected to respective gas sources and an outlet intended to be connected to a user member, a dispensing member selectively movable relative to the body into distinct dispensing positions permitting each inlet to be brought into communication selectively and in turn with the outlet, while the other inlets are isolated from the outlet.

2. Related Art

Industrial applications, in particular those which utilize gaseous hydrogen, comprise a gas-dispensing system connected to one or a plurality of pressurized reservoirs.

For example, in certain applications which utilize hydrogen as an energy carrier, a plurality of pressurized hydrogen reservoirs may be connected in parallel to a fuel cell. Emptying of the reservoirs takes place sequentially, that is to say one after the other.

The majority of the existing installations utilize inversion control units permitting one reservoir to be emptied in relation to the other, as preferred. These control units typically comprise two regulators mounted in parallel and controlled at two different detent pressures. The reservoir connected to the line containing the regulator that is controlled at the highest detent pressure then empties first. These inversion control units are adapted to the case of two reservoirs being connected to the application. The safety gas cut-off function is assured downstream by a solenoid valve in the common circuit.

To mitigate the consequences of a fire, it is possible to install a thermal fuse in each line, upstream of the inversion control unit.

In the case where more than two reservoirs are connected in parallel, the inversion control units must be replaced by other devices. For example, a previously disclosed system utilizes a bayonet consisting of the same number of solenoid valves as there are reservoirs connected in parallel to the same user outlet. An automated control assures the opening sequences of the solenoid valves as a function of the reservoir to be emptied. In order to protect the reservoirs from the fire via a heat-sensitive discharge valve (thermal fuse in particular), it is then necessary to install such a valve in each line (in addition to each solenoid valve).

These installations call for a large number of valves and fuses as well as a programming logic for the automated control of the entire system. This architecture is costly and not very compact and increases the probability of unwanted actuations of the fuses.

SUMMARY OF THE INVENTION

One object of the present invention is to alleviate all or part of the abovementioned disadvantages of the prior art.

To this end, the device according to the invention, which moreover conforms to the generic definition given by the above preamble, is characterized essentially in that the device comprises an emergency discharge system that is capable of displacement into an active position, in which all the gas inlets are brought simultaneously into a forced relationship with a gas discharge outlet.

Moreover, embodiments of the invention may comprise one or a plurality of the following characteristics:
- the emergency discharge system includes a thermal fuse,
- the emergency discharge system includes an actuator that is selectively movable manually or by electromechanical means,
- the actuator is capable of translational displacement and includes one extremity projecting beyond the housing with a view to its actuation,
- the emergency discharge system is capable of displacement from a neutral position towards the active position, the emergency discharge system in the neutral position permitting the selective displacement of the dispensing member into the dispensing positions, and the emergency discharge system in the active position displacing the dispensing member into a disengaged position preventing the said dispensing positions,
- the dispensing member is forced by a resetting member towards the disengaged position and, in the neutral position, the emergency discharge system forms a removable stop preventing the displacement of the dispensing member towards the disengaged position,
- the dispensing member is capable of rotational movement relative to the body, the said dispensing positions being defined by respective angular positions of the dispensing member in relation to the body and to the inlets,
- the dispensing member is capable of translational displacement relative to the body towards the disengaged position,
- the dispensing member includes an internal channel having a downstream extremity in communication with the outlet and an upstream extremity likely to be brought into communication with one or all the inlets depending on the position of the dispensing member relative to the body,
- the emergency discharge system is repositionable in its neutral position after having been displaced into the active position,
- the emergency discharge system includes a thermal fuse consisting of a metallic eutectic having a predetermined melting temperature between 85° C. and 120° C. and preferably between 105° C. and 115° C.,
- the housing consists of a single piece or a plurality of assembled pieces,
- the housing includes a discharge outlet for any internal leaks,
- the device includes one or more sealing joints ensuring the fluid sealing of the flow of gas between the mobile pieces in relation to one another (in particular between the housing and the dispensing member),
- the dispensing member is rotatably mounted relative to the housing about a shaft mounted on the housing,
- the gas discharge outlet coincides with the outlet intended to be connected to a member which is a user member of the gas.

The invention also relates to a gas-dispensing installation on the basis of a plurality of pressurized gas sources utilized sequentially in order to supply a user, the installation consisting of a dispensing device according to one of the characteristics described above or below, the said sources being connected fluidly respectively to the gas inlets of the housing, the user being connected fluidly to the outlet of the housing.

The invention may also relate to any device or alternative procedure consisting of any combination of the characteristics described above or below.

BRIEF DESCRIPTION OF THE FIGURES

Other features and advantages will be appreciated from a reading of the following description, given with reference to the Figures, in which.

DETAILED DESCRIPTION OF THE INVENTION

Figure 1:
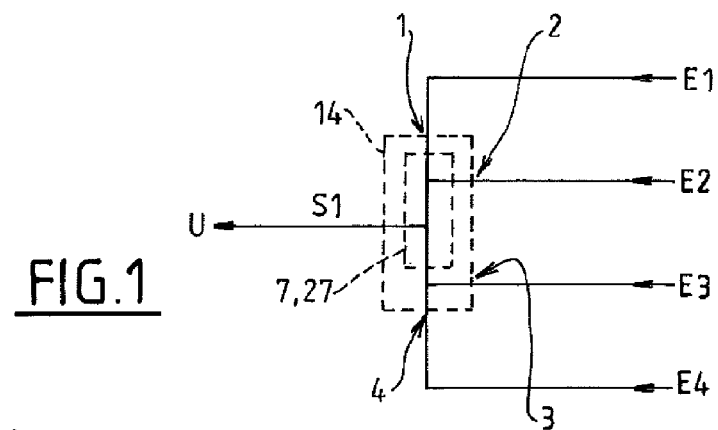
FIG. 1 depicts a schematic and partial view illustrating the structure of a typical gas-dispensing installation according to the invention.

FIG. 1 illustrates a non-restrictive example of an installation consisting of four gas sources (E1 to E4) such as pressurized gas reservoirs (for example for hydrogen). The four sources E1 to E4 are connected in parallel to a gas-dispensing device 14 consisting of an outlet S1 connected to a user U of gas (for example a fuel cell). The four sources E1 to E4 are connected fluidly to respective inlets 1, 2, 3, 4 of the dispensing device 14. The dispensing device can be controlled to supply the user U from sources that are emptied in a sequential manner.

According to one advantageous characteristic of the invention, the dispensing device 14 possesses an emergency discharge system 7, 27 enabling venting of the gas arriving from the said sources E1 to E4, the emergency discharge system 7, 27 being common to the four gas sources. This emergency discharge system 7, 17 discharges the gas towards an outlet in a controlled manner and/or in response to a dangerous situation (in the event of fire, for example).

Figure 2:
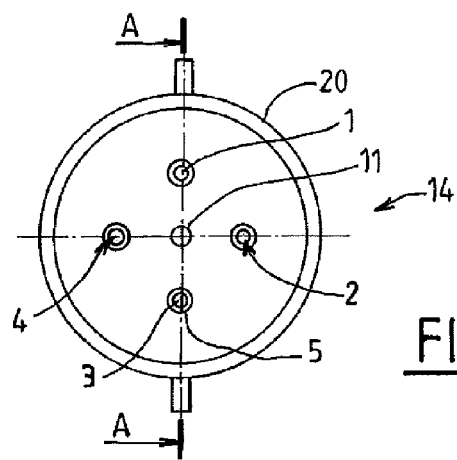
FIG. 2 depicts a schematic and partial rear view of a first example of a gas-dispensing device according to the invention.
Figure 3:
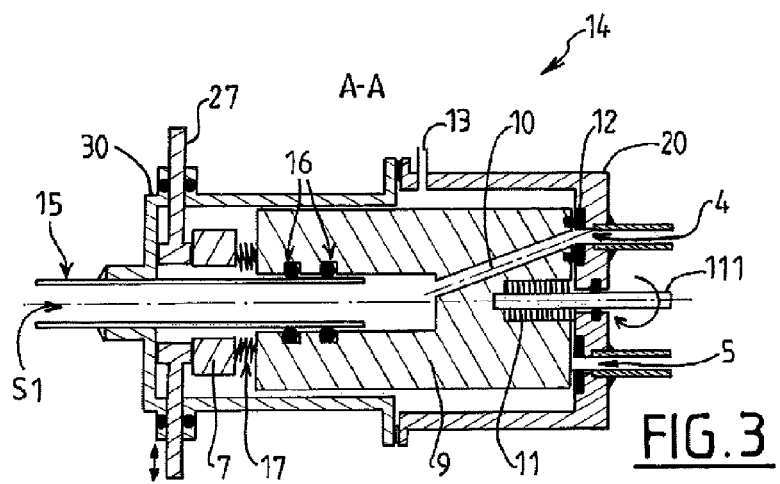
FIG. 3 depicts a view in longitudinal section according to the line AA of the gas-dispensing device in FIG. 2.

In the non-restrictive illustrative embodiment described in FIGS. 2 and 3, the gas-dispensing device 14 comprises a housing 20, 30, for example consisting of two parts 20, 30. The housing 20, 30 at one of its extremities consists of a plurality of orifices forming gas inlets 1, 2, 3, 4 intended to be connected respectively to gas sources E1, E2, E3, E4. Another extremity of the housing 20, 30 includes an orifice forming an outlet S1 for gas intended to be connected to a member which is a user member U of the gas supplied by the sources E1, E2, E3, E4.

A dispensing member 9 is arranged in a movable fashion in the body 20, 30. The dispensing member 9 is selectively movable relative to the body 20, 30 and to the inlets 1, 2, 3, 4 into distinct dispensing positions permitting each inlet 1, 2, 3, 4 to be brought into communication selectively and in turn with the outlet S1 (while the other inlets are isolated from the outlet S1).

For example, the dispensing member 9 is able to rotate inside the housing 20, 30 about a longitudinal shaft 111 mounted in the housing 20, 30. The dispensing member 9 consists of an internal channel 10 having one downstream extremity in communication with the outlet S1 and one upstream extremity likely to be brought into communication with one or all of the inlets 1, 2, 3, 4 depending on the position of the dispensing member 9 relative to the body 2, 13. The angular position of the dispensing member 9 is controlled, for example, via an electromagnetic actuator or some other appropriate control system (not illustrated here).

For example, the four inlets 1, 2, 3, 4 are arranged at 90 degrees relative to one another in relation to the shaft 111. In this way, for each rotation through 90 degrees, the inlets 1 to 4 may be brought successively into communication with the outlet S1 via the channel 10. As illustrated, between two dispensing positions, the dispensing member 9 passes through positions at 45°, in which isolation is present between the outlet S1 and the inlets 1 to 4.

According to one possible architecture, the dispensing member 9 is forced in a sealed manner against the face of the housing 20 provided with the inlets 1 to 4 via a resetting element such as one or a plurality of springs 17 and/or one or a plurality of Belleville washers. The seal between the channel 10 and the orifices can be assured by one or a plurality of o-rings 12 or by any other appropriate means.

The resetting element 17, which forces the dispensing member 9 against the inlets 1 to 4, is based on a thermal fuse 7 and an actuator forming a mechanical restraint 27, for example.

Another resetting element 11, such as a spring (in particular a compression spring), causes the dispensing member 9 to move in a direction toward the outlet S1. In the dispensing member 9 position illustrated, referred to as the neutral position, the emergency discharge system 7, 11, 17, 27 permits the normal (sequential) functioning of the dispenser 14.

However, the emergency discharge system 7, 11, 17, 27 is capable of displacement into a position, referred to as the active position, in which all the gas inlets 1, 2, 3, 4 are brought simultaneously into a forced relationship with a gas discharge outlet.

In the event of a fire, for example, the fuse 7 melts from a certain temperature threshold. The resetting member 11 then causes the dispensing member 9 to slide longitudinally towards the outlet S1. The seal between the channel 10 and the face of the housing 20, 30 is then lost. In this position, all the inlets 1 to 4 are then simultaneously in communication with the outlet S1 and an optional natural leakage orifice 13.

The same result is achieved when the restraint 27 is displaced (manually or automatically). For example, the actuator 27 is capable of translational displacement inside the housing 20, 30 and consists of one extremity projecting beyond the housing in order to permit its actuation.

That is to say that two distinct commands (via a thermal fuse 7 and/or via an actuator 27) permit an emergency discharge of gas.

A new thermal fuse 7 and/or the actuator 27 are preferably repositionable (resetting in a neutral position).

The discharge of the gas in the event of switching into an active position is achieved, for example, via the outlet S1. It is, of course, possible to provide for this discharge of the gas to utilize a different dedicated orifice for this purpose. In the active position, for example, the inlets 1, 2, 3, 4 may be brought into fluid communication with another discharge orifice.

The housing 20, 30 may also comprise an orifice 13 for the collection and discharge of any natural leaks which could occur in the vicinity of the seal 12 and between the inlets 1 to 4 and the outlet S1.

As depicted, the outlet S1 may coincide with pipework 15 which engages in the interior of the housing 20, 30 or even in the interior of a holder for the body of the dispensing member 9. One or more sealing joints 16 may be provided in order to ensure sealing between the pipework 15 and the housing 20, 30 and the dispensing member 9. This pipework may also ensure a guidance function for the dispensing member 9 in its translation between the neutral position and the active position.

Figure 4:
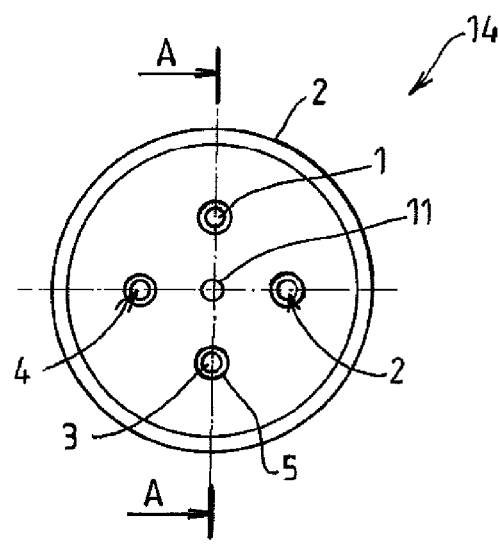
FIG. 4 depicts a schematic and partial rear view of a second example of a gas-dispensing device according to the invention.
Figure 5:
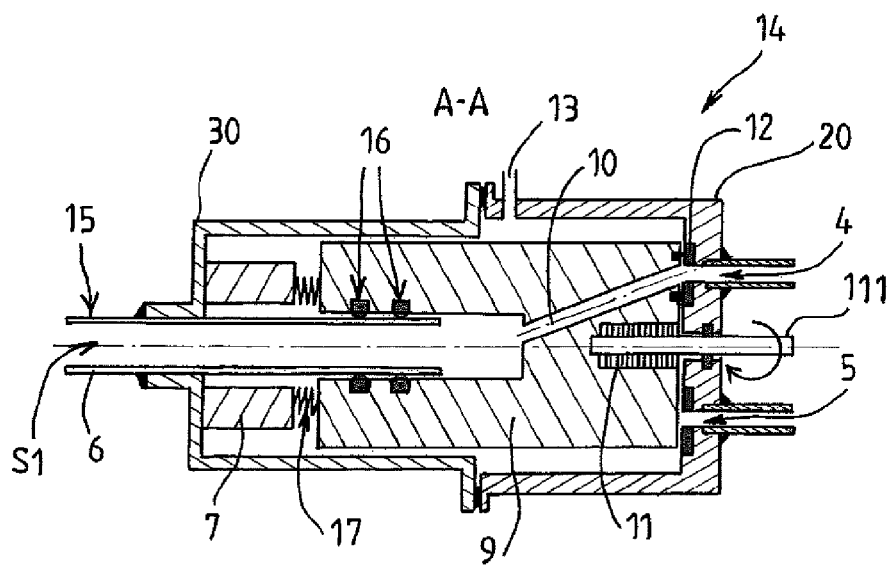
FIG. 5 depicts a view in longitudinal section according to the line AA of the gas-dispensing device in FIG. 4.

The variant embodiment depicted in FIGS. 4 and 5 is distinguishable from those in FIGS. 2 and 3 only in the sense that it does not comprise an actuator. That is to say that only a thermal fuse maintains the dispensing member 9 in the dispensing positions. For the sake of brevity, the elements that are identical to those described above are not described for a second time and are designated by the same numerical references.

The invention thus permits the achievement of a sequential supply of a plurality of gas sources with an emergency discharge system which vents the installation in the event of fire and/or in the event of a situation which is considered unsafe via a separate control unit.

The structure is more simple and less costly than the existing solutions.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas-dispensing device for connecting a plurality of pressurized gas sources sequentially to a user, the device comprising:
    a housing provided with a plurality of gas inlets intended to be connected to respective gas sources;
    an outlet intended to be connected to a user member, wherein a dispensing member is selectively movable relative to the body into distinct dispensing positions permitting each inlet to be brought into communication selectively and in turn with the outlet while the other inlets are isolated from the outlet; and
    an emergency discharge system capable of displacement into an active position in which all the gas inlets are brought simultaneously into a forced relationship with a gas discharge outlet, wherein the emergency discharge system is capable of displacement from a neutral position towards the active position, wherein:
        in the neutral position, the emergency discharge system allows the selective displacement of the dispensing member into the dispensing positions in the sense that, in the active position, the emergency discharge system displaces the dispensing member into a disengaged position preventing the dispensing positions;
        the dispensing member is forced by a resetting member towards the disengaged position;
        in the neutral position, the emergency discharge system forms a removable stop preventing the displacement of the dispensing member towards the disengaged position; and
        the emergency discharge system includes a thermal fuse.

2. The device of claim 1, wherein the emergency discharge system includes an actuator that is selectively movable manually or by electromechanical means.

3. The device of claim 2, wherein the actuator is capable of translational displacement and includes one extremity projecting beyond the housing for its actuation.

4. The device of claim 1, wherein the dispensing member is capable of rotational movement relative to the body, the dispensing positions being defined by respective angular positions of the dispensing member in relation to the body and to the inlets.

5. The device of claim 1, wherein the dispensing member is capable of translational displacement relative to the body towards the disengaged position.

6. The device of claim 1, wherein the dispensing member includes an internal channel having a downstream extremity in communication with the outlet and an upstream extremity likely to be brought into communication with one or all the inlets depending on the position of the dispensing member relative to the body.

7. The device of claim 1, wherein the emergency discharge system consists of a thermal fuse consisting of a metallic eutectic having a predetermined melting temperature between 85° C. and 120° C.

8. The device of claim 1, wherein the housing consists of a single piece or a plurality of assembled pieces.

9. The device of claim 1, wherein the gas discharge outlet coincides with the outlet intended to be connected to a user member of the gas.

10. The device of claim 7, wherein the metallic eutectic has a predetermined melting temperature between 105° C. and 115° C.

11. A gas-dispensing installation on the basis of a plurality of pressurized gas sources utilized sequentially to supply a user, the installation comprising a dispensing device in accordance with claim 1, said pressurized gas sources being connected fluidly respectively to the gas inlets of the housing, the user being connected fluidly to the outlet of the housing.

* * * * *